United States Patent [19]

Kato et al.

[11] Patent Number: 4,646,188
[45] Date of Patent: Feb. 24, 1987

[54] VTR TAPE CASSETTE

[75] Inventors: Shinichiro Kato; Teruo Chiba; Tadao Igarashi, all of Miyagi, Japan

[73] Assignee: Sony Corporation, Tokyo, Japan

[21] Appl. No.: 465,283

[22] Filed: Feb. 9, 1983

[30] Foreign Application Priority Data

Feb. 9, 1982 [JP] Japan .............................. 57-16663[U]

[51] Int. Cl.⁴ .......................... G11B 15/43; G11B 23/4
[52] U.S. Cl. .................................... 360/132; 242/199; 242/76
[58] Field of Search ..................... 360/96.5, 96.2, 96.1, 360/90, 84, 93, 132; 242/197, 199, 76

[56] References Cited

U.S. PATENT DOCUMENTS

| | | | |
|---|---|---|---|
| 3,979,779 | 3/1974 | Esashi et al. | 242/199 |
| 4,131,243 | 12/1978 | Machida | 242/199 |
| 4,342,436 | 8/1982 | Oyama | 242/199 |
| 4,382,565 | 5/1983 | Shiba | 242/199 |
| 4,408,733 | 10/1983 | Ooishi et al. | 242/199 |
| 4,463,918 | 8/1984 | Takagi | 242/199 |

FOREIGN PATENT DOCUMENTS 2001296 7/1978 United Kingdom .
2015477 2/1979 United Kingdom .
2072141 1/1981 United Kingdom .

Primary Examiner—Stuart N. Hecker
Assistant Examiner—Benjamin Urcia
Attorney, Agent, or Firm—Lewis H. Eslinger; Alvin Sinderbrand

[57] ABSTRACT

A tape cassette for use with a video tape recorder has conventional tape guiding and braking elements within its housing, including a pair of spaced guide pins for the tape adjacent each reel and a resilient strip that acts on the tape between the spaced guide pins and normally tends to deflect the tape from a straight path between the spaced guide pins for braking the tape when the cassette is not in use. A drag member is provided that contacts the tape when it is deflected to provide a tortuous path for the tape and thereby increase the resistance to tape movement.

5 Claims, 11 Drawing Figures

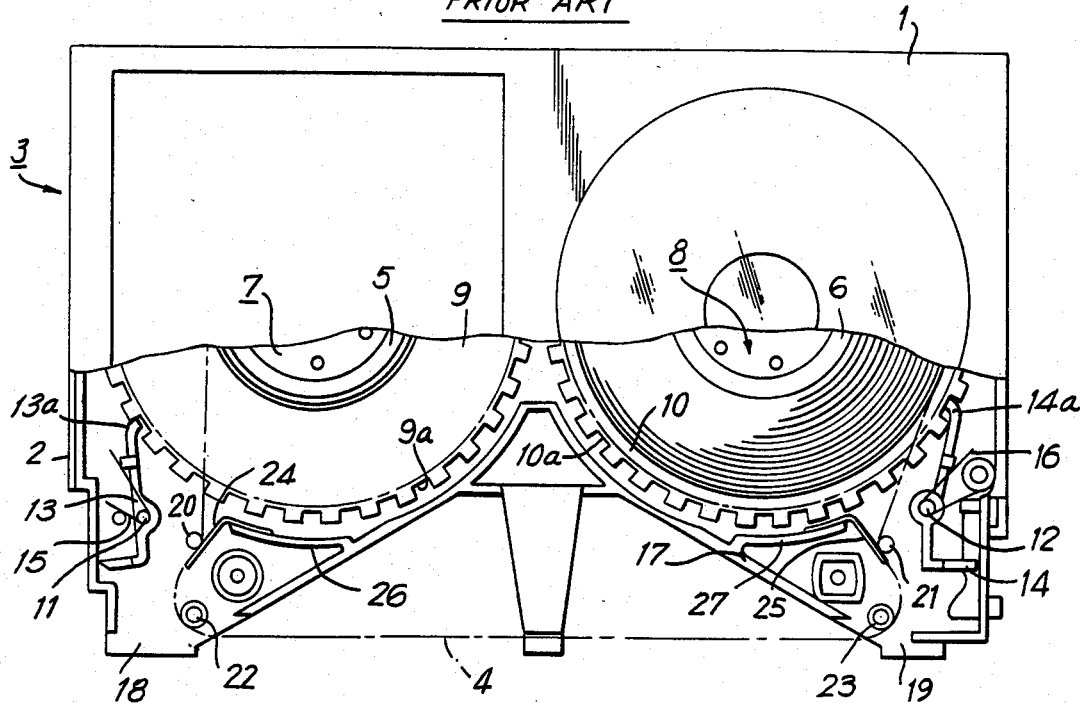

VTR TAPE CASSETTE

BACKGROUND OF THE INVENTION

1. Field of the Invention

This invention relates to tape cassettes and, more particularly, to a tape cassette for use with video tape recorders (VTR) and the like.

2. Background of the Invention

In a tape cassette used with a VTR, a magnetic tape in a cassette housing runs from a supply reel in the cassette housing, to a rotary magnetic head assembly in the body of the VTR, and back to a take-up reel in the cassette housing. The length of tape that contacts the head assembly in the VTR is outside the cassette housing and is exposed when the cassette is not in use. If that exposed length of tape becomes slack when the cassette is not in use, the loading mechanism for winding the magnetic tape around the rotary magnetic heads in the VTR can malfunction, preventing the magnetic tape from loading properly. At best, the VTR will not operate; at worst the tape can be damaged or ruined. Moreover, the slack length of tape protruding from the cassette is more susceptible to damage when the cassette is being handled.

Prior art tape cassettes use resilient braking strips to brake the tape as it travels to and from the tape reels and to avoid undesirable slack in the exposed length of tape. The tape engages a pair of spaced guide pins between each tape reel and an opening in the cassette housing. The cassette has two resilient braking strips, one associated with each pair of guide pins, and each resilient strip has a free end that is resiliently urged to extend across the space between the respective guide pins and thus contacts a face of the tape spanning the space between the respective guide pins. When the tape is running, it is pulled tight between the paired guide pins, which pushes the free end of each resilient braking strips against the biasing force of the latter. When the tape is not running, and hence is not tensioned, each resilient strip extends across the space between the respective pair of guide pins and is intended to press the tape against one of the respective guide pins to brake or frictionally resist movement of the tape therebetween. The free end portion of each resilient braking strip also pushes against the tape when the latter is tensioned while running so as to avoid undesirable slack in the tape in that condition.

However, a significant shortcoming of the above arrangement is that it becomes less effective as the cassette gets older. When the cassette is new, the resilient braking strip has sufficient resilience to prevent movement of the tape by pressing the tape against a guide pin when the cassette is not in use. However, as the cassette gets older, the braking strip, because it flexes each time the tape slackens and tightens, loses its resilience. Thus, the braking strip no longer bears with sufficient force against a guide pin and does not provide enough braking force when the cassette is not in use.

OBJECTS AND SUMMARY OF THE INVENTION

Accordingly, it is an object of this invention to provide a tape cassette that avoids the above difficulties encountered with prior art cassettes.

More particularly, it is an object of this invention to provide a tape cassette with an improved braking arrangement that restricts the formation of slack in the exposed length of tape even when the effectiveness of the resilient braking strip has been affected by age.

Another object of this invention is to provide a tape cassette, as aforesaid, in which the improved braking arrangement does not interfere with the efficient assembly of the cassette.

In accordance with an aspect of this invention, in a tape cassette comprising a housing, a pair of tape reels rotatably mounted in said housing in co-planar, side-by-side relation, a tape wound on said reels with a length of said tape extending between said reels, the housing having an opening extending adjacent each of the reels and through which said length of the tape passes for exposure outside of said housing, a pair of spaced guide pins mounted in the housing between each of the reels and the opening and being engageable with the length of the tape for defining a straight path for the tape between each pair of guide pins, and a resilient strip within the housing associated with at least one of the pairs of guide pins, said strip having one end secured to the housing and another end which is free and is resiliently urged to project across the straight path defined by the associated guide pins for contacting one face of the tape and deflecting the contacted tape from said straight path so long as the contacted tape is under a tension insufficient to overcome the resilient urging of the strip; there is further provided a drag member fixedly located in the housing to be engaged by the other face of the tape between the free end of the resilient strip and one of said associated guide pins and to provide a tortuous path for the tape when the latter is deflected from said straight path by the resilient strip.

In accordance with another aspect of the invention, the cassette housing includes base and cover portions, the base portion has the guide pins and each resilient strip mounted thereon and holds tape reels in position during assembly of the cover portion on the base portion, the cover portion has the drag member mounted thereon, and the drag member has a contact surface for operatively contacting said other face of said tape when said cover portion is in assembled relation to said base portion and a positioning surface for directing said tape into engagement with said contact surface during the assembly of the cover portion on the base portion.

The above, and other objects, features and advantages of the invention, will be apparent in the below detailed description of illustrative embodiments of the invention which is to be read in connection with the accompanying drawings wherein the same reference numerals are used to identify like parts in the several views.

BRIEF DESCRIPTION OF THE DRAWINGS

FIG. 1 is a top plan view, partly broken away and in section, of a prior art VTR tape cassette;

FIG. 2 is a fragmentary, enlarged view showing how a tape braking arrangement according to the prior art operates, particularly when a resilient strip thereof is new;

DETAILED DESCRIPTION OF THE PREFERRED EMBODIMENTS

Figure 3:
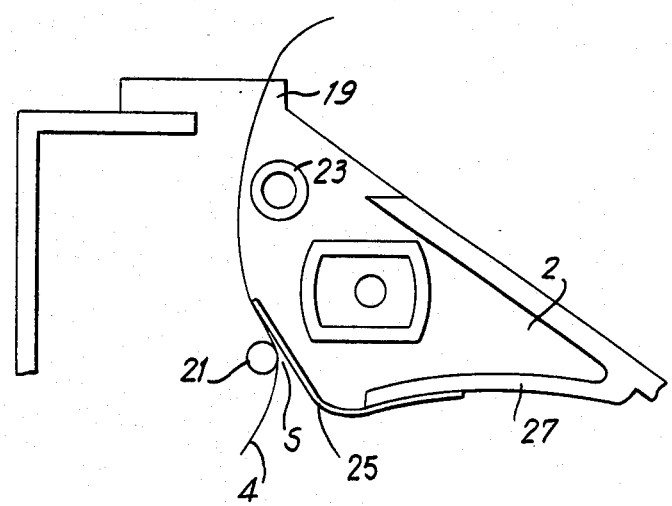
FIG. 3 is a view similar to that of FIG. 2, but showing how the arrangement thereof loses its effectiveness with age.
Figure 4:
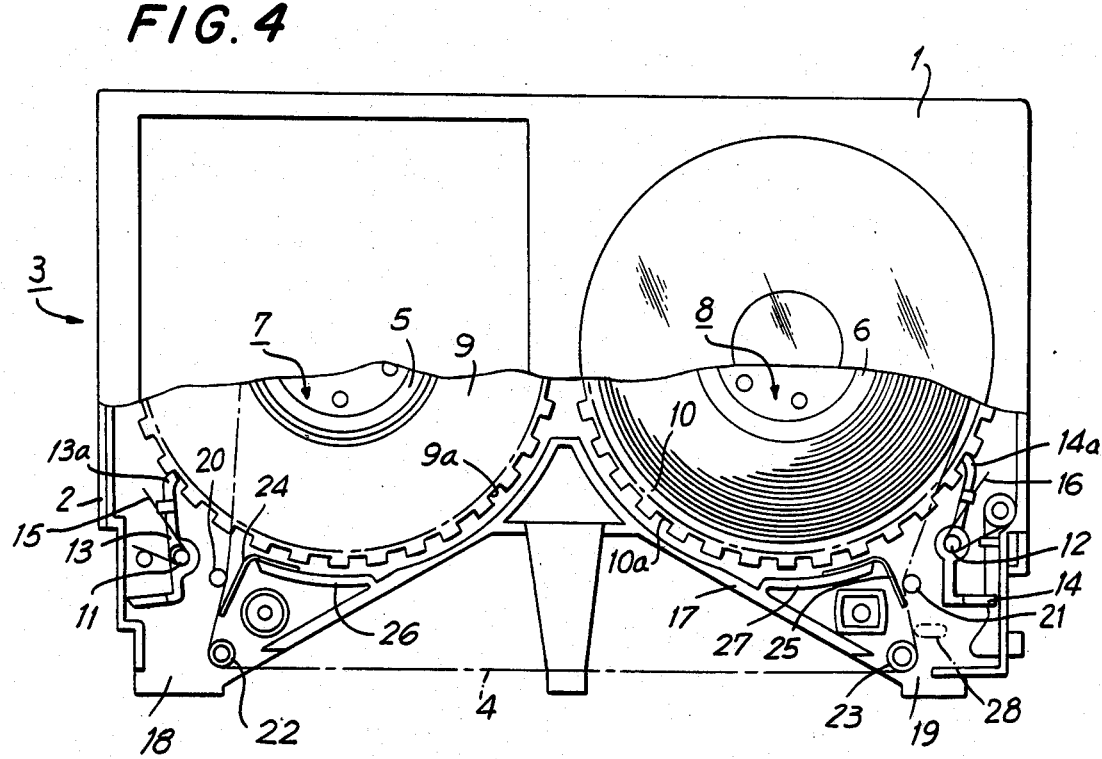
FIG. 4 is a view similar to that of FIG. 1, but showing a VTR tape cassette according to an embodiment of the present invention.

Initially, a prior art tape cassette in which the present invention is desirably incorporated will be described in detail with reference to FIGS. 1 through 3. FIG. 1 shows the tape cassette to have a housing base portion 1 and cover portion 2 that together constitute a cassette housing 3 accommodating a tape 4 therein. A pair of rotatable tape reels 7 and 8 with hubs 5 and 6, respectively, are disposed in housing 3 and the magnetic tape 4 is wound around reels 7 and 8 from the respective ends of the tape. Flanges 9 and 10 on the respective tape reels 7 and 8, have, at their peripheral edges series of notches 9a and 10a. Support shafts 11 and 12 extend from portion base 2 and have reel-locking members 13 and 14, respectively, pivotally mounted thereon. The reel-locking members 13 and 14 have engaging nails 13a and 14a, formed at their respective ends, that are pressed against the peripheral surfaces of flanges 9 and 10 on tape reels 7 and 8 by torsion springs 15 and 16 mounted on support shafts 11 and 12. The engaging nails 13a and 14a are thus urged to enter engaging notches 9a and 10a on the flanges 9 and 10 to prevent the tape reels 7 and 8 from rotating when the tape cassette is not in use. When the tape cassette is not in use, for example, in a video tape recorder (VTR), a conventional mechanism (not shown) of the VTR angularly displaces the reel-locking members 13 and 14 against the force of springs 15 and 16 to thereby dislodge the engaging nails 13a and 14a from notches 9a and 10a of the tape reels 7 and 8 and free the latter for rotation.

The cassette housing 3 is shown to have openings 18 and 19, formed at opposite sides of a front wall 17 through which the tape 4 passes to expose a length of the tape for cooperation with the VTR. Between openings 18 and 19 and the respective tape reels 7 and 8, there are pairs of guide pins 20,22 and 21,23 mounted on or formed integrally with base portion 2 for guiding the magnetic tape 4 between tape reels 7 and 8 and the respective openings 18 and 19 in cassette housing 3. These guide pins 20,21, 22 and 23 are made of a suitable synthetic resin and have a smooth peripheral surface. Resilient strips 24 and 25, made of suitable sheet material, have their base ends fixed by bonding to support pieces 26 and 27 integral with base portion 2. The end portions of resilient strips 24 and 25 are free and press the tape 4 in the direction toward the peripheral surfaces of the guide pins 20 and 21, respectively, to form braking arrangements for the tape 4. Thus, the magnetic tape 4 wound around tape reel 7 is guided therefrom over guide pin 20 and past resilient strip 24 to guide pin 22, and then through the opening 18 to the outside of cassette housing 3. After traversing a recess at the front of housing 3, the tape 4 enters housing 3 through the opening 19 and is guided about guide pin 23 and past resilient strip 25 to guide pin 21 from whence the tape returns to the other tape reel 8.

The arrangement of the guide pins 20,21,22 and 23 and the resilient strips 24 and 25 is intended to slightly brake the magnetic tape 4 at all times. For example, when the tape cassette is not in use, and even if the reels 7 and 8 are not engaged with reel-locking members 13 and 14, it is desired that the magnetic tape 4 be kept from becoming slack outside the cassette case 3.

FIG. 2 illustrates, with respect to resilient strip 25 and guide pins 21 and 23, how the prior art arrangement is intended to work. When the tape cassette is not in use, the absence of tension in magnetic tape 4 permits resilient strip 25 to project, at its free end, across the straight path between pins 21 and 23 and to press the tape 4 against guide pin 21, as shown by the dot-dash lines in FIG. 2. Accordingly, the magnetic tape 4 is sandwiched between resilient strip 25 and guide pin 21 and this provides added resistance to the movement of the magnetic tape 4 so that the magnetic tape is kept from becoming slack and protruding out of cassette housing 3. When the magnetic tape 4 runs, the tape is tensioned or remains taut, as shown by the solid lines in FIG. 2. Thus, magnetic tape 4 is stretched straight between guide pins 21 and 23 while strip 25 is flexed. In this case, the free end of the flexed resilient strip 25 provides a frictional resistance which brakes the magnetic tape 4 while it is running. The resilient strip 24 acts similarly in combination with guide pins 20 and 22 near opening 18.

Since the strips 24 and 25 are made of a resilient material, for example, a suitable synthetic resin, after frequent use of the cassette, strips 24 and 25 may sometimes provide insufficient force due to fatigue, or they may have been inadvertently deformed so as to no longer work as they were intended. FIG. 3 illustrates this condition, in which a space has developed between resilient strip 25 and guide pin 21 even when the tape is slack. The magnetic tape 4 extending through this space is not pressed against guide pin 21. Accordingly, when the tape goes slack, for example, because the reel-locking members 13 and 14 are released, the magnetic tape 4 can project too far outside cassette housing 3, giving rise to unexpected accidents, such as, malfunction of the tape loading device provided in the VTR with which the cassette is to be used.

This invention provides a novel construction capable of frictionally braking the magnetic tape surely and preventing excessive protrusion of the magnetic tape from the cassette housing. A first embodiment of the invention is shown in FIGS. 4 through 7, and is there seen to differ from the conventional tape cassette of FIG. 1 only in that the tape cassette according to the present invention includes a drag member in the form of a post 28 within the housing 3 adjacent the path between guide pins 21 and 23.

The post 28 is located so that when the cover portion 1 is assembled on the base portion 2 to form cassette housing 3, post 28 is located at the side of the tape 4 opposite to the side contacted by the free end of the resilient strip 25 and at a position between the free end of strip 25 and guide pin 23. The post 28 has an elongated cross-section with rounded corners. It includes a contact surface 28a for contacting the confronting face of tape 4 when the tape is deflected from a straight path between guide pins 21 and 23 by resilient strip 25. As shown best in FIG. 6, the lower end of post 28, at the side facing toward magnetic tape 4, has a slanted surface 28b which is contiguous with contact surface 28a. The rounded corners smooth the contact surface 28a to prevent damage to magnetic tape 4.

Figure 8A:
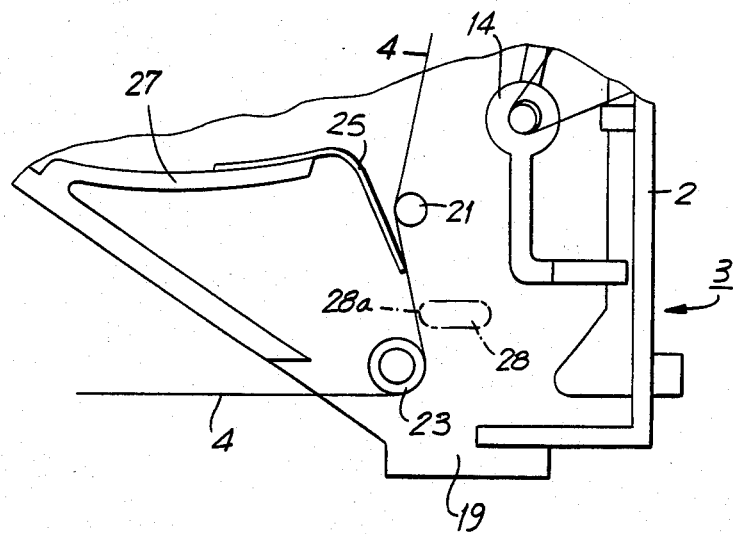
FIGS. 8A, B and C are fragmentary views similar to FIGS. 2 and 3, but illustrating the operation of the tape braking arrangement according to this invention.

The operation of the post 28 will now be described in detail with reference to FIGS. 8A–8C. FIG. 8A shows the magnetic tape 4 drawn tight across the space between guide pins 21 and 23, as is the case when the cassette is in use. When the magnetic tape 4 is tightened and thus follows a straight path between guide pins 21 and 23, as illustrated in FIG. 8A, the contact surface 28a of post 28 is spaced slightly from the magnetic tape 4 so that the post 28 does not interfere with the running of the magnetic tape 4. The free end portion of resilient arm 25 frictionally engages the tensioned tape and thus operates as it does in the prior art cassette described with reference to FIGS. 1–3.

Figure 8B:
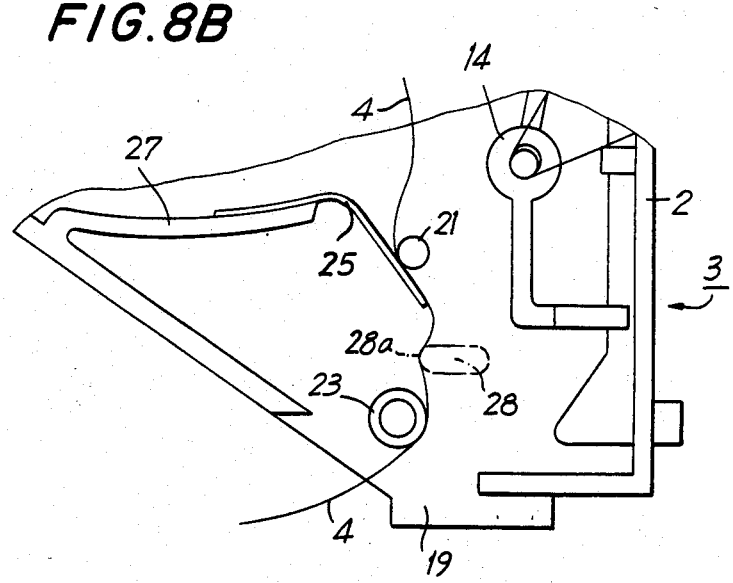

FIG. 8B shows the magnetic tape 4 in a slack condition, for example, upon release of the reel-locking members 13 and 14. In that case, the free end of resilient strip 25 projects across the straight-path between pins 21 and 23 and presses the magnetic tape 4 between the resilient strip 25 and guide pin 21, as in the prior art. Further, the free end of the resilient strip 25 deflects the tape 4 so that the latter is wrapped partly about the contact surface 28a of post 28. The tape between guide pins 21 and 23 assumes a tortuous path at its contact with surface 28a which provides resistance against movement of the magnetic tape 4. Therefore, post 28 acts as a drag member for increasing resistance to movement of the tape when the latter is slack. Accordingly, even if the reel-locking members 13 and 14 are released, the magnetic tape 4 is securely held in the cassette housing 3.

Figure 8C:
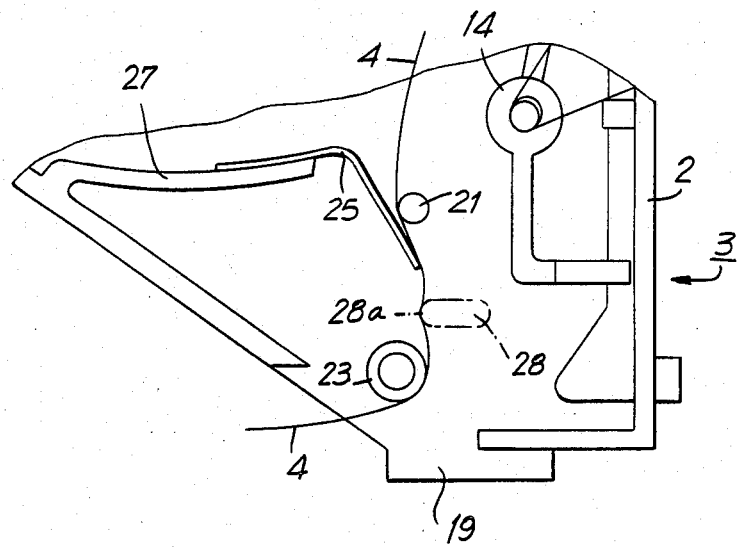

FIG. 8C illustrates the operation of the cassette embodying this invention when the elasticity of resilient strip 25 has been reduced by age so that a space is left between resilient strip 25 and guide pin 21 even when magnetic tape 4 is slack. In such case, resilient strip 25 still deflects the tape into contact with contact surface 28a of post 28 and, accordingly, the tape assumes a tortuous path that provides sufficient resistance to tape movement.

It is particularly advantageous, in the cassette embodying the invention to provide post 28 on the housing cover portion 1. This offers several advantages.

Figure 5:
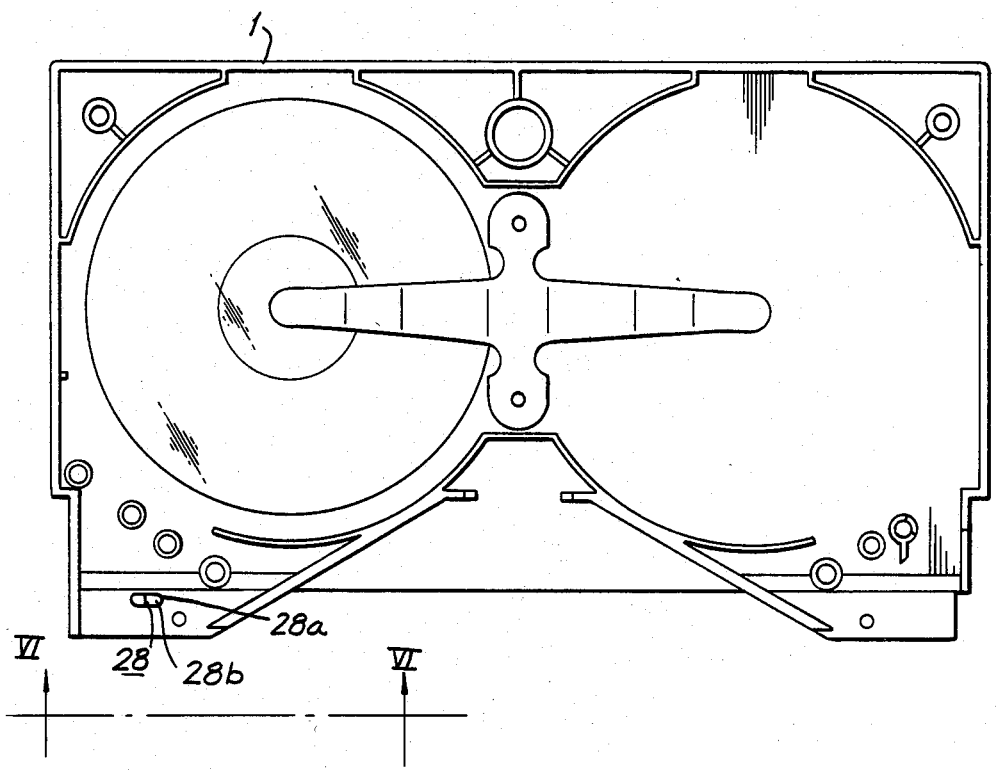
FIG. 5 shows the inside of the cover portion of a tape cassette housing incorporating a drag member according to the present invention.
Figure 6:
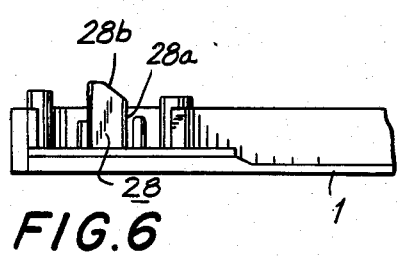
FIG. 6 is a fragmentary elevational view of the housing cover portion as viewed in the direction of the arrows VI—VI on FIG. 5.
Figure 7:
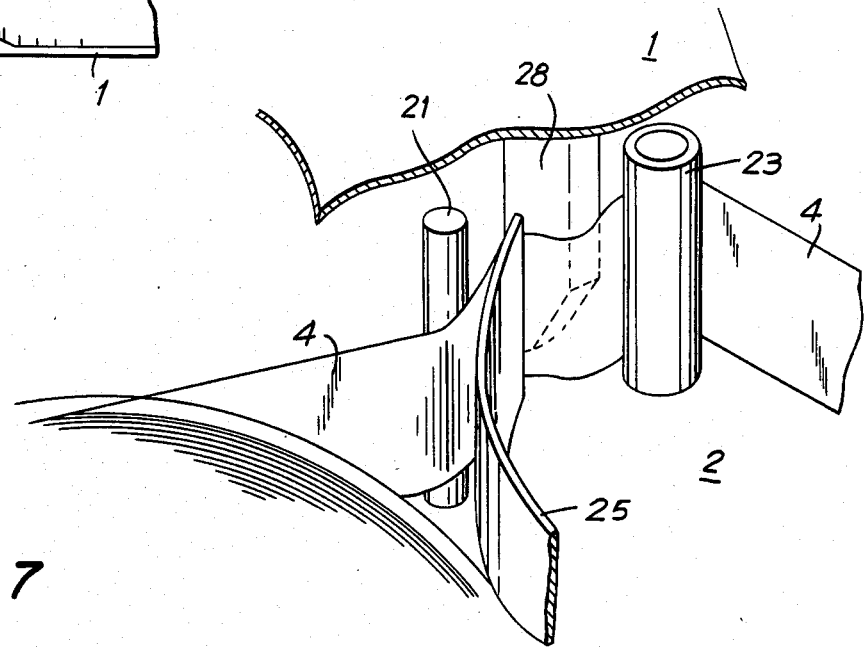
FIG. 7 is a detailed, perspective view showing the cooperative relation of elements included in a tape braking arrangement incorporating the present invention.

In the manufacturing tape cassettes, the tape reels 7 and 8 with the tape wound therearound for example, of the type described above, from its respective ends, are prepared and installed on the housing base portion 2 while holding the respective guide elements and strips 24,25 in a jig arranged so that the magnetic tape properly passes around those elements of the cassette. If the arrangement of the elements for guiding the tape is too complex, the jig and other devices also become complex and the apparatus for assembling the tape in the housing is increased in cost and the frequency of assembly errors increases. However, when post 28 is formed on the housing cover portion 1, as shown in FIG. 5, and had a slanted positioning surface 28b at its lower end, the method of assembling magnetic tape 4 and tape reels 7 and 8 in the cassette housing can remain the same as in the prior art. The cover portion 1 is then merely lowered onto the base portion 2 and, in the course of such movement, the slanted surface 28b on post 28 acts to direct or deflect the magnetic tape 4 and position it for contact with contact surface 28a.

Figure 9:
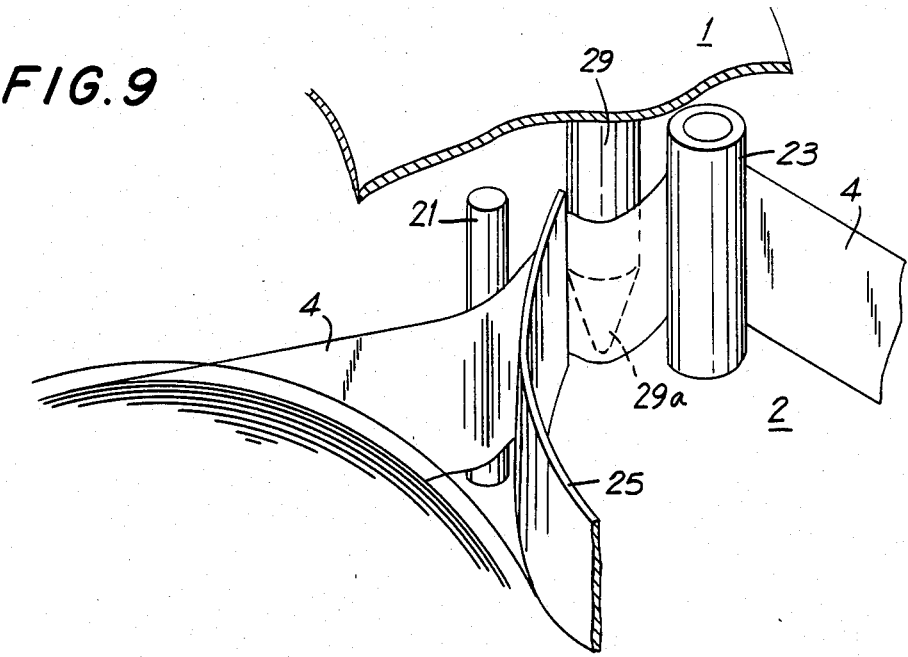
FIG. 9 is a perspective view similar to that of FIG. 7, but showing another embodiment of this invention.

Although in the above-described embodiment of the invention, the drag member is a post 28 with an elongated cross-section, such drag member can have other configurations, such as, that of a pin 29 illustrated in FIG. 9. In such case, a conical end 29a at the lower portion of pin 29 comprises the positioning means for directing or deflecting the tape during assembly of cover portion 1 on base portion 2.

In each of the embodiments described so far, the drag member 28 or 29 is located not to contact the magnetic tape 4 until it is deflected a predetermined amount by the resilient strip 25. However, the drag member may be located to lightly contact the tape even when it is running. Furthermore, although the above-described embodiments show a drag member 28 or 29 only near the opening 19, a cassette according to the invention can be formed with drag members similarly associated with the guide pins 20,22 and 21,23 near both of the openings 18 and 19.

Having described specific preferred embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tape cassette comprising:
a housing;
a pair of tape reels rotatably mounted in said housing in co-planar, side-by-side relation;
a tape wound on said reels with a length of said tape extending between said reels;
said housing having an opening extending adjacent each of said reels and through which said length of the tape passes for exposure outside of said housing;
a pair of spaced guide pins mounted in said housing between each of said reels and said opening and being engageable with said length of the tape for defining a straight path for the tape between each pair of guide pins;
a resilient strip within said housing associated with at least one of the pairs of said guide pins, said strip having one end secured to said housing and another end which is free and is resiliently urged to project across said straight path defined by the associated guide pins for contacting one face of the tape and deflecting the contacted tape from said straight path so long as said contacted tape is under a tension insufficient to overcome the resilient urging of said strip; and
a drag member fixedly located in said housing to be engaged by the other face of said tape between said free end of the resilient strip and one of said associated guide pins and located proximate said free end of said resilient strip, such that when said tape is deflected from said straight path by said resilient strip said drag post and said resilient strip cooperate to provide a tortuous path for the tape when the latter is deflected from said straight path by said resilient strip.

2. A tape cassette as in claim 1; wherein said drag member is located for avoiding contact with said tape until said resilient strip deflects said tape a predetermined distance out of said straight path between said associated guide pins.

3. A tape cassette as in claim 1; wherein said housing includes base and cover portions; said base portion has said guide pins and each said resilient strip mounted thereon and includes means for holding said tape reels in position during assembly of said cover portion on said base portion; said cover portion has said drag member mounted thereon; and said drag member has a contact surface for operatively contacting said other face of said tape when said cover portion is in assembled relation to said base portion and a positioning surface for directing said tape into engagement with said contact surface during assembly of said cover portion on said base portion.

4. A tape cassette as in claim 3; wherein said drag member is in the form of a post having a generally rectangular cross-section with rounded corners and being directed downwardly from said cover portion, said contact surface is formed by said rounded corners at one end of said rectangular cross-section, and said positioning surface is a slanted surface at the lower end of said post.

5. A tape cassette as in claim 3; wherein said drag member is in the form of a rod of substantially circular cross-section depending from said cover portion and having a conical lower end, said contact surface is formed by the surface of said rod, and said positioning surface is defined by said conical end.

* * * * *